United States Patent
Wang et al.

(10) Patent No.: US 8,036,538 B2
(45) Date of Patent: *Oct. 11, 2011

(54) METHOD AND OPTICAL AMPLIFIER FOR LASER SAFETY PROTECTION AND METHOD FOR LOADING IDENTIFICATION SIGNAL

(75) Inventors: Hao Wang, Shenzhen (CN); Yiquan Lu, Shenzhen (CN); Congqi Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 330 days.
This patent is subject to a terminal disclaimer.

(21) Appl. No.: 11/948,648

(22) Filed: Nov. 30, 2007

(65) Prior Publication Data
US 2008/0075459 A1    Mar. 27, 2008

Related U.S. Application Data

(63) Continuation of application No. PCT/CN2006/001192, filed on Jun. 2, 2006.

(30) Foreign Application Priority Data

Jun. 3, 2005  (CN) .......................... 2005 1 0074888

(51) Int. Cl.
*H04B 10/02* (2006.01)

(52) U.S. Cl. ............ 398/181; 398/177; 398/33; 398/30; 398/31; 398/32; 359/337; 359/341

(58) Field of Classification Search ...................... 398/33, 398/177, 180, 181, 38, 30, 31, 26, 37, 173, 398/18, 11, 6, 32, 10, 13, 14, 15, 16, 17, 398/20, 34, 151; 359/337, 341
See application file for complete search history.

(56) References Cited

U.S. PATENT DOCUMENTS 6,008,915 A    12/1999    Zyskind
(Continued)

FOREIGN PATENT DOCUMENTS

CN    1165444 A    11/1997
(Continued)

OTHER PUBLICATIONS

European Office Action (Nov. 2, 2009).
(Continued)

*Primary Examiner* — Hanh Phan
(74) *Attorney, Agent, or Firm* — Leydig, Voit & Mayer, Ltd.

(57) ABSTRACT

A method for laser safety protection in an optical communication system includes: a downstream station detecting whether an identification signal loaded by an upstream station on a main optical channel in a direction from the upstream station to the downstream station, exist on the main optical channel; if the identification signal is not detected, the downstream station executing a scheduled safety protection procedure. Methods for loading an identification signal on a main optical channel in an optical communication system and an optical amplifier of laser safety protection, which implement loading the identification signal by controlling the change of pump light of optical amplifier or the wave motion of signal light of main optical channel, are also provided. The solution makes it possible to reliably detect a fiber failure when RAMAN amplifiers or remotely-pumped amplifiers exist, thereby implementing laser safety protection.

11 Claims, 3 Drawing Sheets

U.S. PATENT DOCUMENTS

| | | |
|---|---|---|
| 6,188,508 B1 | 2/2001 | Horiuchi et al. |
| 6,483,616 B1 | 11/2002 | Maddocks et al. |
| 6,731,428 B2 | 5/2004 | Gehlot |
| 6,937,820 B2* | 8/2005 | Iwaki et al. ............... 398/6 |
| 7,099,595 B2* | 8/2006 | Touma ..................... 398/177 |
| 7,103,275 B2 | 9/2006 | Fujiwara |
| 7,218,442 B2* | 5/2007 | Akbaba et al. ............ 359/334 |
| 7,248,804 B2* | 7/2007 | Maeda et al. ............. 398/180 |
| 2002/0114060 A1 | 8/2002 | Kobayashi et al. |
| 2002/0141332 A1 | 10/2002 | Barnard et al. |
| 2003/0011855 A1 | 1/2003 | Fujiwara |
| 2004/0047628 A1* | 3/2004 | Passier et al. .............. 398/15 |
| 2004/0136727 A1 | 7/2004 | Androni et al. |
| 2004/0213567 A1 | 10/2004 | Deguchi et al. |
| 2005/0078351 A1 | 4/2005 | Avallone et al. |
| 2008/0240713 A1* | 10/2008 | Lu et al. .................... 398/17 |

FOREIGN PATENT DOCUMENTS

| | | |
|---|---|---|
| CN | 1267981 A | 9/2000 |
| CN | 1426178 A | 6/2003 |
| EP | 0963065 A | 12/1999 |
| GB | 2377839 A | 1/2003 |
| GB | 2400511 A | 10/2004 |
| JP | 2004-104354 A | 4/2004 |
| WO | WO 03/069812 A1 | 8/2003 |

OTHER PUBLICATIONS $2^{nd}$ Office Action in corresponding Chinese Application No. 200510074888.4 (Oct. 15, 2009).

Rejection Decision in corresponding Chinese Application No. 200510074888.4 (May 27, 2010).

$1^{st}$ Office Action in corresponding Chinese Application No. 200680011940.4 (Feb. 12, 2010).

$2^{nd}$ Office Action in corresponding Chinese Application No. 200680011940.4 (Apr. 2, 2011).

2nd Office Action in corresponding European Application No. 06742079.4 (Nov. 2, 2009).

Written Opinion of the International Searching Authority in corresponding PCT Application No. PCT/CN2006/001192 (Sep. 14, 2006).

Office Action in corresponding Indian Application 5629/CHENP/2007 (Jun. 27, 2011).

* cited by examiner

METHOD AND OPTICAL AMPLIFIER FOR LASER SAFETY PROTECTION AND METHOD FOR LOADING IDENTIFICATION SIGNAL

CROSS REFERENCE TO RELATED APPLICATIONS

This application is a continuation of International Patent Application No. PCT/CN2006/001192, filed Jun. 2, 2006, which claims priority to Chinese Patent Application No. 200510074888.4, filed Jun. 3, 2005, both of which are hereby incorporated by reference.

FIELD OF THE INVENTION

The present invention relates to optical network communication technology, and more particularly, to a method and an optical amplifier for laser safety protection in an optical communication system and methods for loading an identification signal on a main optical channel.

BACKGROUND OF THE INVENTION

Because of the excellent directivity of laser, the power density of laser in the output direction is especially high, which greatly threatens human eyes. The wavelength of lasers used in the existing communication system is generally around 870 nm, 1310 nm and 1550 nm, which are all beyond the wavelength range of a visible light. Because it is invisible, the light beam has a greater possibility to hurt human eyes. After the inventions of Erbium-Doped Fiber Amplifier (EDFA) and Wavelength Division Multiplexing (WDM) techniques, the output power of optical signals carried in fibers is even higher than that of conventional Synchronous Digital Hierarchy (SDH) devices. In addition, such apparatuses as RAMAN amplifier may be introduced into the existing communication system, which makes the power of optical signals carried in fibers of some systems reach or even exceed 30 dBm. Such a high power of the optical signal greatly threatens safety of operators and maintenance personnel of telecommunication system.

The safety level of laser apparatus and device is defined in Standard IEC60825, which specifies the specific operational measure and safety identifier as well. The International Telecommunication Union-Telecommunication Standardization Sector (ITU-T) constitutes Standard G.664 for laser safety in communication system. According to the Standard G.664, an optical communication apparatus should be able to automatically reduce the output power to safe power and even turn off a laser when a laser leakage occurs. The solution is expressed as an Automatic Power Reduction (APR) and an Automatic Power Shutdown (APSD) solution in G.664.

SUMMARY OF THE INVENTION

The present invention provides a simple and effective method for laser safety protection in an optical communication system, which features reliable detection of fiber failure, even in the case that RAMAN amplifiers or remotely-pumped amplifiers are adopted, for laser safety protection.

A method for laser safety protection in an optical communication system includes:

loading, by an upstream station, an identification signal on the main optical channel in the direction from the upstream station to a downstream station;

detecting, by the downstream station, whether the identification signal exists on the main optical channel, if the identification signal is detected, determining that a fiber of the main optical channel is normal;

if the identification signal is not detected, determining that a failure occurs on the fiber of the main optical channel, executing a scheduled safety protection procedure.

The identification signal is an intensity modulated signal or a pulse signal loaded on the main optical channel.

The intensity modulated signal may be loaded by: controlling the intensity change of pump light of an optical amplifier on the upstream station to enable an optical signal of the main optical channel to generate a wave motion in compliance with the wave motion of the intensity modulated signal; or by setting a signal light intensity modulation module at the upstream station side of the main optical channel, and controlling the signal light intensity modulation module to enable an optical signal of the main optical channel to generate a wave motion in compliance with the wave motion of the intensity modulated signal.

The detecting the identification signal of the main optical channel by the downstream station includes:

splitting a portion of an optical light from the main optical channel; converting the optical signal into an electrical signal by photoelectric conversion; filtering the electrical signal to restore a signal within the frequency range of the identification signal; and detecting and determining whether the signal is the identification signal.

The method further implements analog-digital conversion for the filtered electrical signal before detecting the signal.

For the purpose of loading an identification signal in the procedure of laser safety protection in an optical communication system, the present invention further provides a method for loading an identification signal on a main optical channel in an optical communication system. The method includes: controlling the pump current of a pump laser of an optical amplifier changing in compliance with a changing rule, to make the pump light enable the optical signal of the main optical channel to generate a wave motion in compliance with the wave motion of an identification signal.

The controlling the pump current includes: determining the wave motion of a control signal according to the frequency and amplitude of the identification signal to be loaded; loading the control signal into the pump current of the pump laser, or controlling the intensity change of pump current to comply with the changing rule; or controlling the pulse width change of pump current to comply with the changing rule.

For the purpose of loading an identification signal in the above procedure of safety protection, the present invention further provides another method for loading an identification signal on a main optical channel in an optical communication system, and the method includes:

setting a signal light intensity modulation module on the main optical channel in the optical communication system;

controlling the signal light intensity modulation module by using a control signal which is the same as the identification signal to be loaded.

For the purpose of loading an identification signal in the procedure of laser safety protection in an optical communication system, the present invention provides a first optical amplifier for laser safety protection, and the first optical amplifier for laser safety protection includes:

a gain component for amplifying an optical signal inputted, and outputting the optical signal;

a pump laser component for providing a pump light for the gain component;

a control component for generating and controlling the pump current of pump laser component;

the control component further includes:

a control signal generating module, for adjusting the pump current to enable the output pump current of the control component to carry a control signal, and the control signal controlling the wave motion of the pump light to comply with a changing rule to enable the output signal of the optical amplifier to carry an identification signal.

The control component of the optical amplifier further includes:

a filtering module, for filtering an electrical signal acquired by implementing implemented photoelectric conversion of an optical signal from the gain component, reserving a signal within the frequency range of the identification signal;

a signal detecting module, for detecting the signal within the frequency range of the identification signal whether the identification signal exists and sending the detecting result to the control component by which the pump current is controlled according to the detecting result.

For the purpose of loading an identification signal in the process of laser safety protection in an optical communication system, the present invention provides a second optical amplifier for laser safety protection, and the second optical amplifier for laser safety protection includes:

a gain component for amplifying an optical signal inputted, and outputting the optical signal;

a pump laser component for providing a pump light for the gain component;

a control component for generating and controlling the pump current of the pump laser component;

the output terminal of gain component further includes:

a signal light intensity modulation module capable of controlling the intensity change of an optical signal outputted by an optical amplifier according to a control signal to load an identification signal on the optical signal and output the optical signal.

The control component of the optical amplifier further includes:

a filtering module, for filtering an electrical signal acquired by implementing photoelectric conversion of an optical signal from the gain component, reserving a signal within the frequency range of the identify signal;

a signal detecting module, for detecting the signal within the frequency range of the identify signal whether the identification signal exists and sending the detecting result to the control component by which the pump current is controlled according to the detecting result.

For the purpose of detecting an identification signal in the process of laser safety protection of optical communication system, the present invention provides a third optical amplifier for laser safety protection, and the third optical amplifier for laser safety protection includes:

a gain component for amplifying an optical signal and outputting the optical signal;

a pump laser component for providing a pump light for the gain component;

a control component for generating and controlling the pump current of pump laser component;

the control component further includes:

a filtering module, for filtering an electrical signal acquired by implementing photoelectric conversion of an optical signal from the gain component, reserving a signal within the frequency range of the identification signal;

a signal detecting module, for detecting the signal within the frequency range of the identify signal whether the identification signal exists and sending the detecting result to the control component by which the pump current is controlled according to the detecting result.

As can be seen from the above, the method of implementing laser safety protection of optical communication system provided by the present invention solves the laser safety problem in the case that RAMAN amplifiers or remotely-pumped amplifiers exist, the detecting manner thereof is more reliable than the Optical Transponder Unit (OUT) manner, and no misjudgment exists.

Adding such a control function in the existing control mode of optical amplifier may load the identification signal on the main optical channel, and cost of the optical amplifier is not increased, thereby the implementing cost is low.

Because the identification signal is a low-frequency signal, the PIN diode at the input side of optical amplifier may also be used for detecting the identification signal as well as detecting the power, which makes implementation simple.

DETAILED DESCRIPTION OF THE INVENTION

Automatic Power Reduction (APR) is implemented by the adding of a link state detecting component and a laser output control component in an optical communication device. For example, the APR procedure of a common optical amplifier in an optical communication system is as follows.

Figure 1:
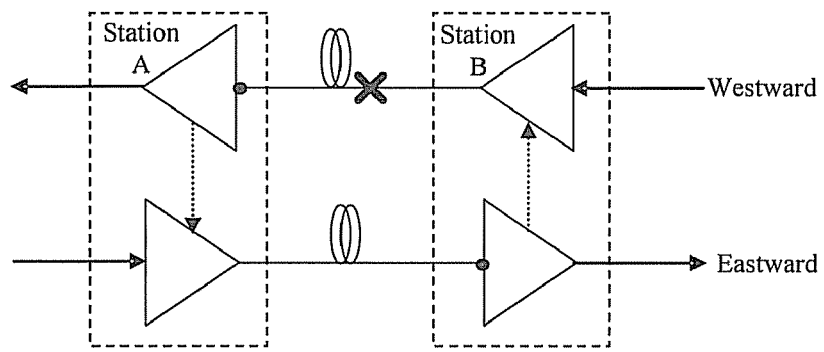
FIG. 1 is a schematic diagram illustrating an APR procedure of an optical amplifier.

As shown in FIG. 1, if there is a potential laser leakage because of a failure on the westward fiber from station B to station A, the westward optical amplifier of station A will detect loss of the optical signal sent from station B by the link state detecting component, and determine that there is a potential laser leakage on the fiber from station B to station A. The potential laser leakage may also exist on the fiber from station A to station B. The westward optical amplifier of station A will notify the eastward optical amplifier of station A to reduce the output power to make the laser leakage on the fiber from station A to station B be compatible with the safety level constituted by Standard IEC60825. Therefore, operators and maintenance personnel are protected. The eastward optical amplifier of station B will detect power reduction or loss of the eastward optical signal. The eastward optical amplifier of station B performs the same procedure described above. In other words, the eastward optical amplifier of station B notifies the westward optical amplifier of station B to reduce the output power to make the laser leakage from station A to station B compatible with the safety level constituted by Standard IEC60825.

The implementation procedure of APSD is similar to that of APR, and a difference is that the APSD solution directly shuts down the laser or optical amplifier, rather than reduces the output power to the safe power.

The APR and the APSD of the existing communication apparatuses are basically implemented by detecting optical power. In other words, when the optical power in the receiving direction is abnormal, optical power output in its reverse direction is reduced or shut down at once, so the laser leakage in the reverse direction is controlled within an allowable range specified by the safety standard, and the opposite side device is also notified to perform protection procedure. The key of the APR and the APSD solutions is detecting whether the received optical power is below a certain threshold to decide whether there is a potential laser leakage on the fiber. However, APR is unavailable with optical power detection alone when RAMAN amplifiers or remotely-pumped amplifiers exist.

Figure 2:
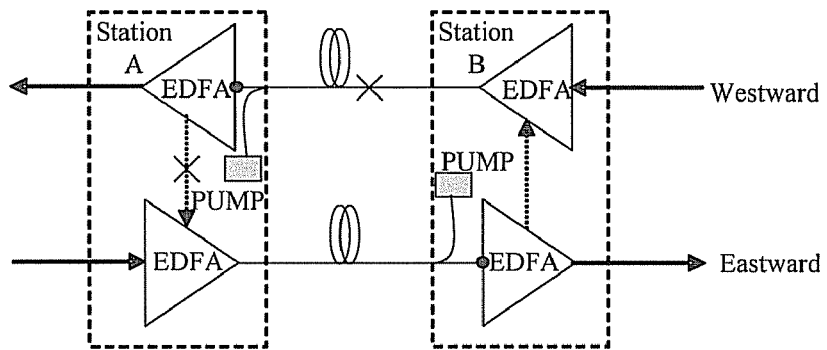
FIG. 2 is a schematic diagram illustrating an APR procedure of an optical amplifier with RAMAN amplifiers.

As shown in FIG. 2, when a RAMAN amplifier or a remotely-pumped amplifier exists, the pump light of the RAMAN amplifier or the remotely-pumped amplifier is often inputted to the transmission fiber in the reverse direction of signal light. In this situation, if there is a failure, such as fiber broken on the westward fiber from station B to station A, leading to laser leakage, a high optical power can also be detected at the westward receiving side of station A, for a part of pump light will be reflected back when the pump light is inputted into the fiber, and the reverse stimulated RAMAN scattering will also be generated and received by station A in the direction of light signal, which makes it impossible to make an accurate judgment through optical power detection.

The method for implementing laser safety protection of optical communication system in accordance with the present invention is as follows. An upstream station loads an identification signal on a main optical channel when transmitting optical signals to a downstream station. The downstream station detects whether the identification signal exists in the main optical channel. If the identification signal is detected, the downstream station determines that the fiber where the main optical channel is located is normal, and no actions shall be taken. If the identification signal is not detected, the downstream station determines that a failure occurs in the fiber where the main optical channel is located, initiates a scheduled safety protection procedure such as APR procedure, and reduces or turns off the reverse amplifier output of the station to induce the upstream station to initiate APR procedure as well. Therefore, laser safety protection is implemented in response to some fiber failures. Independent of the detection of signal power, a fiber failure may be exactly identified even in the case that RAMAN amplifiers or remotely-pumped amplifiers are used according to the present invention, because the existence of the identification signal is independent of pump light and the intensity of the pump light or the reflected light on the main optical channel.

A simple solution for loading an identification signal on the main optical channel is to load a low amplitude intensity modulated signal on the main optical channel. In other words, the main optical channel is taken as a bearer for carrying an intensity modulated signal. The intensity modulated signal will be received by the downstream station along with the signals of main optical channel. When the intensity modulated signal is detected, the downstream station determines that the signal from the upstream station is normal, and determines that there is no failure on the fiber. Two preferred embodiments of this solution are described as follows in detail.

An optical amplifier is always used in a Wavelength Division Multiplexing (WDM) system to meet the requirement of optical multiplexing and de-multiplexing. The optical amplifier used in the WDM system generally adopts automatic gain control or automatic power control to guarantee that the power of the optical signal of each channel amplified by the optical amplifier keeps steady rather than being affected by adding or dropping the wavelength signals. The principle of both the automatic gain control and the automatic power control is to amplify the optical signal by controlling the output power of the pump laser of the optical amplifier.

Figure 3:
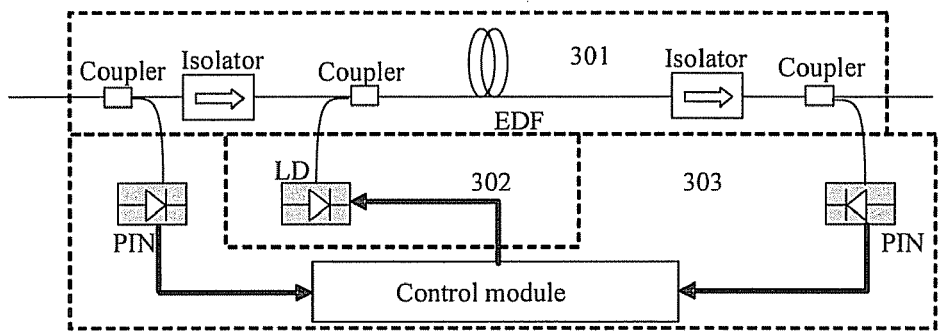
FIG. 3 is a schematic diagram illustrating the structure of an EDFA.

The structure of an optical amplifier is shown in FIG. 3. For example, in the EDFA usually used at present, an optical amplifier is composed of gain component 301, pump laser component 302 and feedback control component 303. The bold line represents electrical signal and the normal line represents optical signal in FIG. 3. Gain component 301 connects to the main optical channel fiber and includes couplers, isolators and an Erbium-Doped Fiber (EDF). Pump laser component 302 is mainly composed of pump laser LDs like semiconductor lasers. Feedback control component 303 is composed of PIN diodes and a control module. A fraction of the input optical signals un-amplified by the optical amplifier and a fraction of the output optical signals amplified by the optical amplifier are split respectively via couplers. After a photoelectric conversion in the PIN diode, the signals are inputted to the control module. The control module analyses the input and output signals, and controls the pump current outputted to the pump laser LD to generate appropriate pump light intensity, so that the signal light and the pump light are amplified by the EDF into a level as required. The detection of pump light intensity is not illustrated in FIG. 3. In practice, a detection component for detecting the pump light intensity may exist. There may be a plurality of pump lasers.

In view of the above operational principle and feature of optical amplifier, in a first preferred embodiment of the present invention, a low amplitude intensity modulated signal is loaded in the output signal of optical amplifier by the use of the control module of optical amplifier for controlling the output light intensity of the pump laser.

The procedure for loading the low amplitude intensity modulated signal in this embodiment is described as follows in detail with the EDFA as an example. As is well known, the operational principle of EDFA is to pump the erbium ion to its excited state via the pump light. The relaxation time of the erbium ion from its excited state to its meta-stable state is very short. The erbium ion will self-excite from its excited state to its meta-stable state quickly. Because the relaxation time of the erbium ion from its meta-stable state to its ground state is relatively long, the population inversion will occurs between the meta-stable state and the ground state of the erbium ion, and the signal light may be self-amplified via the population inversion of the erbium ion. On the basis of this principle, the control module may indirectly control the inversion population of erbium ion of EDF by controlling the pump current of pump laser, thus the gain change of signal light passing the optical amplifier can be controlled.

Life time of erbium ion in the meta-stable state, which is about 10 ms, is relatively long. Therefore, if the low amplitude intensity modulation is loaded on the signals of the main optical channel by controlling the pump light output intensity of the pump laser, the time period of signal controlling the pump laser should be longer than life time of erbium ion in the meta-stable state; otherwise, the periodic output change of pump laser induces no periodic change of inversion population of erbium ion, thus the low amplitude intensity modulation may not be performed on the output signal of the amplifier, and the present invention may be not realized as well. Therefore, a low-frequency and low-amplitude control signal of which the period is greater than 10 ms may be loaded into the pump current in this embodiment, and the change of pump current of pump laser may be controlled by intensity modulation or Pulse Width Modulation (PWM), so that the intensity of the signal light passing the optical amplifier also generates low-frequency and low-amplitude changes. In other words, the identification signal is loaded. The above procedure may be implemented by the adding of a control signal generating module to the control component of optical amplifier.

Figure 4:
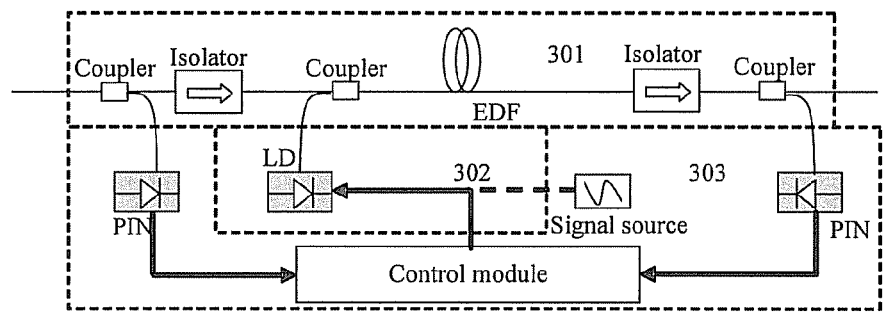
FIG. 4 is a schematic diagram illustrating the structure of an EDFA capable of transmitting an identification signal according to a preferred embodiment of the present invention.

As shown in FIG. 4, a signal source with low frequency and low amplitude is added in feedback control component 303 as the control signal generating module. The signal source may generate a low-frequency and low-amplitude control signal for intensity modulation or pulse width modulation as required. The wave motion of amplitude and frequency of control signal may be predetermined through calculating in conjunction with the modulation manner being used according to the features such as amplitude and frequency of the intensity modulated signal that is required for loading on the main optical channel, and the wave motion of amplitude and frequency of control signal may be predetermined through experimental media as well. The signal source is configured to generate the low-frequency and low-amplitude control signal, and the output of the signal source is loaded to the pump current signal originally outputted by the control module. The pump light intensity outputted by the laser will have a low amplitude and periodic wave motion; therefore, the low amplitude wave motion of the intensity of the output optical signal of main optical channel passing the EDFA is induced, and the intensity modulated signal is loaded on the main optical channel. The signal source may also connect to a control module which controls the output of the signal source.

Optionally, the control module may be directly controlled to generate the pump current carrying the control signal. For example, a low-speed control module may be added in feedback control component 303 as a control signal generating module. The low-speed control module may be a hardware logic module or a software module. In one aspect, the control module keeps the original function of quickly responding for the signal change, for example, the input signal power will change when a path of signals are newly added or dropped, the quickly responding function makes the control module immediately adjust the pump current to an appropriate value according to the signal power changes to enable the optical amplifier to correspondingly amplify the signal. In another aspect, the low-speed control module is driven by time, which slowly and periodically controls the control module to change the pump current in lower-amplitude, so that the outputted pump current may be simultaneously controlled by a high-speed control procedure and a low-speed control procedure. A similar effect of adding a low-frequency and low-amplitude modulated signal in the pump current of pump laser is achieved. Therefore, the low-amplitude modulated signal is loaded on the main optical channel.

Loading the identification signal on the main optical channel is not limited to the manner of controlling the pump of amplifier. In a second preferred embodiment of the present invention, a signal light intensity modulated module, such as a variable attenuator or a variable gain component, is added in the main optical channel to load the identification signal on the main optical channel.

Figure 5:
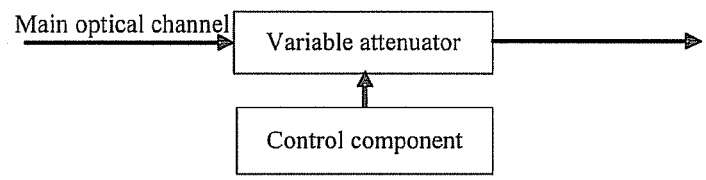
FIG. 5 is a schematic diagram of adding an identification signal on a main optical channel by using a variable attenuator according to an embodiment of the present invention.
Figure 6:
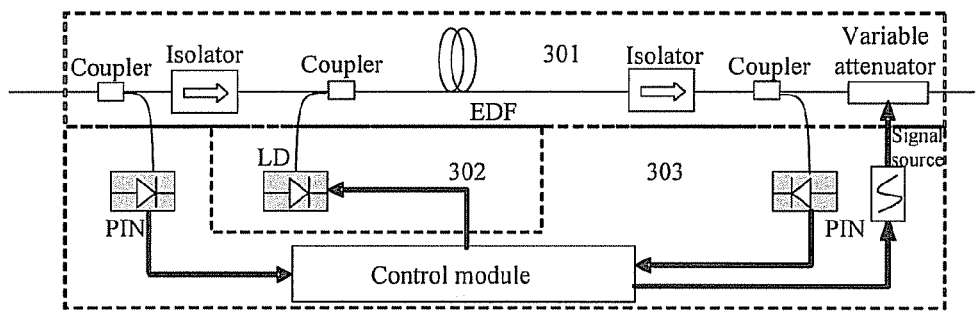
FIG. 6 is a schematic diagram illustrating the structure of an EDFA of loading an identification signal on main optical channel through setting a variable attenuator in the optical amplifier according to a preferred embodiment of the present invention.

As shown in FIG. 5, a variable attenuator may be a Mach-Zehnder (MZ) modulator or a Voltage Optical Attenuator (VOA). The variable attenuator may be set at the upstream station side of main optical channel and controlled by a control signal outputted from a control component, and the control signal is the same as the identification signal required. The wave motion of the identification signal induces the change of attenuation of the variable attenuator. Therefore, the wave motion of optical power on the main optical channel can be controlled. The identification signal is modulated to the main optical channel. Preferably, the variable attenuator may be set at the location for the optical amplifier outputting signal light and be connected with feedback control component 303 of optical amplifier, and be controlled by the control signal outputted from feedback control component 303. In this way, a signal source needs to be added in feedback control component 303 of optical amplifier, and the signal source outputs the control signal to the control terminal of the variable attenuator. Optionally, the signal source may be connected to and controlled by the control module of feedback control component 303 with reference to FIG. 6. As can be seen, the advantage of this preferred embodiment over the first preferred embodiment is that the control signal is generally the same as the identification signal needing to be loaded and the control signal calculation based on the identification signal is unnecessary.

Optionally, the function of the variable attenuator may also be implemented thoroughly via a variable gain component in the main optical channel. The variable gain component may be a semiconductor laser or an EDF, etc.

For the purpose of detecting the identification signal of main optical channel, photoelectric conversion is performed on the signal light split from the main optical channel before filtered by the filtering module at downstream station. After filtering, only signal within the frequency range of the identification signal left, and the filtered signal is sent to a detecting module for detection, if the identification signal is detected, no actions shall be taken; if the identification signal is not detected, a failure is determines to be occur in the fiber, and a scheduled safety protection procedure is initiated.

Figure 7:
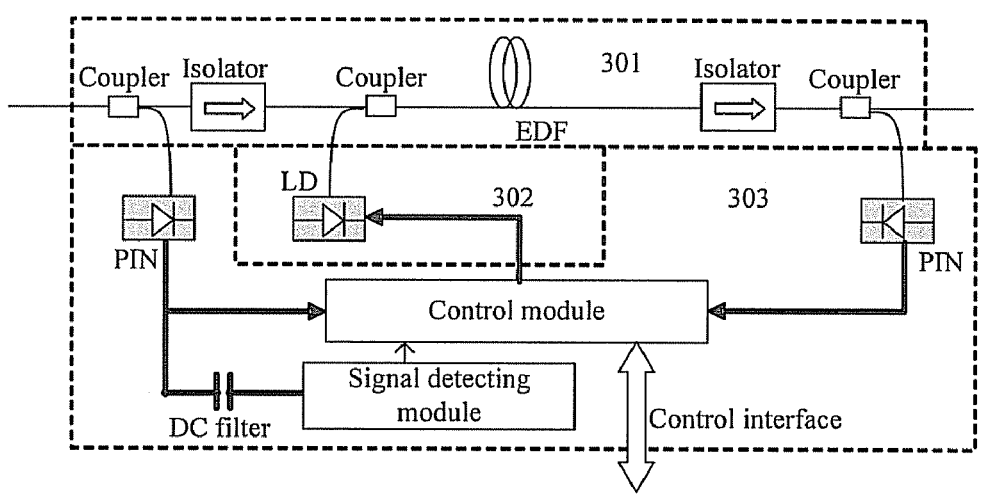
FIG. 7 is a schematic diagram illustrating the structure of an EDFA capable of detecting an identification signal according to a preferred embodiment of the present invention.

Preferably, the above detecting procedure may be implemented in the optical amplifier according to the present invention. As shown in FIG. 7, a direct-current (DC) filter as the filtering module and a signal detecting module are included in feedback control component 303 of the optical amplifier. A portion of optical signal for detection is split via a coupler from the optical signal received by the optical amplifier from the main optical channel in gain component 301. After the optical signal is inputted to a PIN diode for photoelectric conversion, the outputted electrical signal is divided into two paths. One path is inputted to the control module and the other path is inputted to the DC filter. After the electrical signal is filtered by the DC filter, the detecting module detects the identification signal of main optical channel before reporting the detecting result to the control module. If the detecting result indicates that no identification signal of main optical channel exists, the control module will send a signal lost alarm to a network main control component via a control interface to induce the APR procedure, and implementing the laser safety protection of optical communication system. After receiving the detecting result of the identification signal restoration of main optical channel, the control module may send to the network main control component information indicating that the system resumes normal to initiate the automatic restoration procedure of the whole system. Optionally, the filtering module may also be implemented using a low-frequency band-pass filtering module within the frequency range of the identification signal.

Optionally, the signal detecting module may determine whether the identification signal of main optical channel exists through directly detecting the received analog signal to determine whether a low-frequency signal is contained, or determine whether the identification signal of main optical channel exists according to the received digital signal result after performing analog-digital conversion of the received analog signal. Generally, the digital identifier detection is more reliable than the analog identifier detection.

The amplitude of control signal according to the present invention should be controlled to avoid the problem that the identification signal of main optical channel affects the signal quality of main optical channel. Because the overlarge identification signal on the main optical channel will induce the overlarge wave motion of signal light power of the main optical channel, and induce the overlarge cost of giving rise to the Optical Signal Noise Ratio (OSNR) on the signal of main optical channel. The modulation depth of identification signal of main optical channel recommended by the present invention is preferably between 3% and 5%, i.e. the amplitude of identification signal occupies the 3~5% amplitude of signal of main optical channel. Further, the frequency of the identification signal of main optical channel should not be over high for the built-in power detectors of amplifier generally is low-speed devices. The higher the frequency is, the worse the sensitivity is, and the higher the requirement for the modulation depth of main optical channel is, and correspondingly the greater the influence on the main optical signal is for convenient detection of the subsequent station, the present invention recommends that the frequency of identification signal of main optical channel is not more than MHz level, i.e. at or below MHz level.

A low-frequency and low-amplitude intensity modulated signal is used as the identification signal of main optical channel in the forgoing embodiments of the present invention, to which it is not limited, and other manners like a given pulse signal may also be used as the identification signal of main optical channel. Other types of optical amplifiers like rare earth component doped amplifiers or semiconductor optical amplifiers apart from EDFA may also be used as the optical amplifier for implementing the transmitting and detecting function of identification signal of the present invention except the optical amplifier amplifies the optical signal by means of pumping the pump light to the transmission fiber between stations.

The above is the description of the detailed embodiments of the present invention. The method and the device of the present invention can be modified appropriately during a specific implementation, to meet the specific requirements of the specific cases. It is thereby understood that the detailed embodiments according to the present invention are just demonstrative of, but not limitative to the protection scope of the present invention.

What is claimed is:

1. A method for laser safety protection in an optical communication system, comprising:
    detecting, by a downstream station, whether an identification signal, loaded by an upstream station on a main optical channel in a direction from the upstream station to the downstream station, exists on the main optical channel; and
    determining that a failure occurs on the fiber of the main optical channel, executing a scheduled safety protection procedure if the identification signal is not detected;
    wherein the identification signal is an intensity modulated signal or a pulse signal, and wherein the amplitude of the identification signal occupies 3~5% of the amplitude of an optical signal of the main optical channel, and the frequency of the intensity modulated signal is at or below Megahertz level;
    wherein the intensity modulated signal is loaded on the main optical channel by:
        setting a signal light intensity modulation module at the upstream station side of the main optical channel; and
        controlling the signal light intensity modulation module to enable an optical signal of the main optical channel to generate a wave motion in compliance with the wave motion of the intensity modulated signal;
    wherein the signal light intensity modulation module comprises one of a variable attenuator and a variable gain component.

2. The method of claim 1, wherein the intensity modulated signal is loaded on the main optical channel by:
    controlling the intensity change of pump light of an optical amplifier on the upstream station to enable an optical signal of the main optical channel to generate a wave motion in compliance with the wave motion of the intensity modulated signal.

3. The method of claim 2, wherein the optical amplifier is a rare earth element doped amplifier, and the period of the intensity change of the pump light is longer than the life time of a high-energy particle in the excited state of the rare earth element.

4. The method of claim 1, wherein the detecting the identification signal comprises:
    splitting a portion of an optical signal from the main optical channel;
    converting the optical signal into an electrical signal by photoelectric conversion;
    filtering the electrical signal to restore a signal within the frequency range of the identification signal; and
    detecting and determining whether the signal is the identification signal.

5. The method of claim 4, further comprising: implementing analog-digital conversion for the filtered electrical signal before the detecting.

6. The method of claim 1, further comprising:
    determining that a fiber of the main optical channel is normal if the identification signal is detected.

7. A method for loading an identification signal on a main optical channel in an optical communication system, comprising:
    setting a signal light intensity modulation module on the main optical channel in the optical communication system; and
    controlling the signal light intensity modulation module using a control signal which is the same as the identification signal to be loaded, and wherein the amplitude of the identification signal occupies 3~5% of the amplitude of an optical signal of the main optical channel, and the frequency of the intensity modulated signal is at or below Megahertz level;
    wherein the signal light intensity modulation module comprises one of a variable gain component and a variable attenuator.

8. An optical amplifier for laser safety protection, comprising:
    a gain component, for amplifying an optical signal inputted, and outputting the optical signal;
    a pump laser component, for providing a pump light for the gain component; and a control component, for generating and controlling the pump current of the pump laser component;

wherein the gain component further comprises:

a signal light intensity modulation module, for controlling the intensity change of an optical signal outputted by an optical amplifier according to a control signal to load an identification signal on the optical signal, and output the optical signal, and wherein the amplitude of the identification signal occupies 3~5% of the amplitude of an optical signal of the main optical channel, and the frequency of the intensity modulated signal is at or below Megahertz level;

wherein the signal light intensity modulation module comprises one of a variable gain component and a variable attenuator.

9. The optical amplifier of claim 8, wherein the variable gain component comprises one of a rare earth element doped fiber and a semiconductor laser; the variable attenuator comprises one of a Mach-Zehnder, MZ, modulator and a Variable Optical Attenuator, VOA.

10. The optical amplifier of claim 8, wherein the signal light intensity modulation module connects to a control module of the control component which sends the control signal to the signal light intensity modulation module.

11. The optical amplifier of claim 8, wherein the control component further comprises a filtering module, for filtering an electrical signal acquired by implementing photoelectric conversion of an optical signal from the gain component, and reserving a signal within the frequency range to which the identification signal belongs; and a signal detecting module, for detecting the signal within the frequency range of the identify signal from the filtering module whether the identification signal exists and sending the detecting result to the control component by which the pump current is controlled according to the detecting result.

* * * * *